INVENTORS
Antonio Pacciarini
Renato Caretta
BY Stevens, Davis, Miller & Mosher
ATTORNEYS INVENTORS
Antonio Pacciarini
Renato Caretta INVENTORS
*Antonio Pacciarini*
*Renato Caretta*

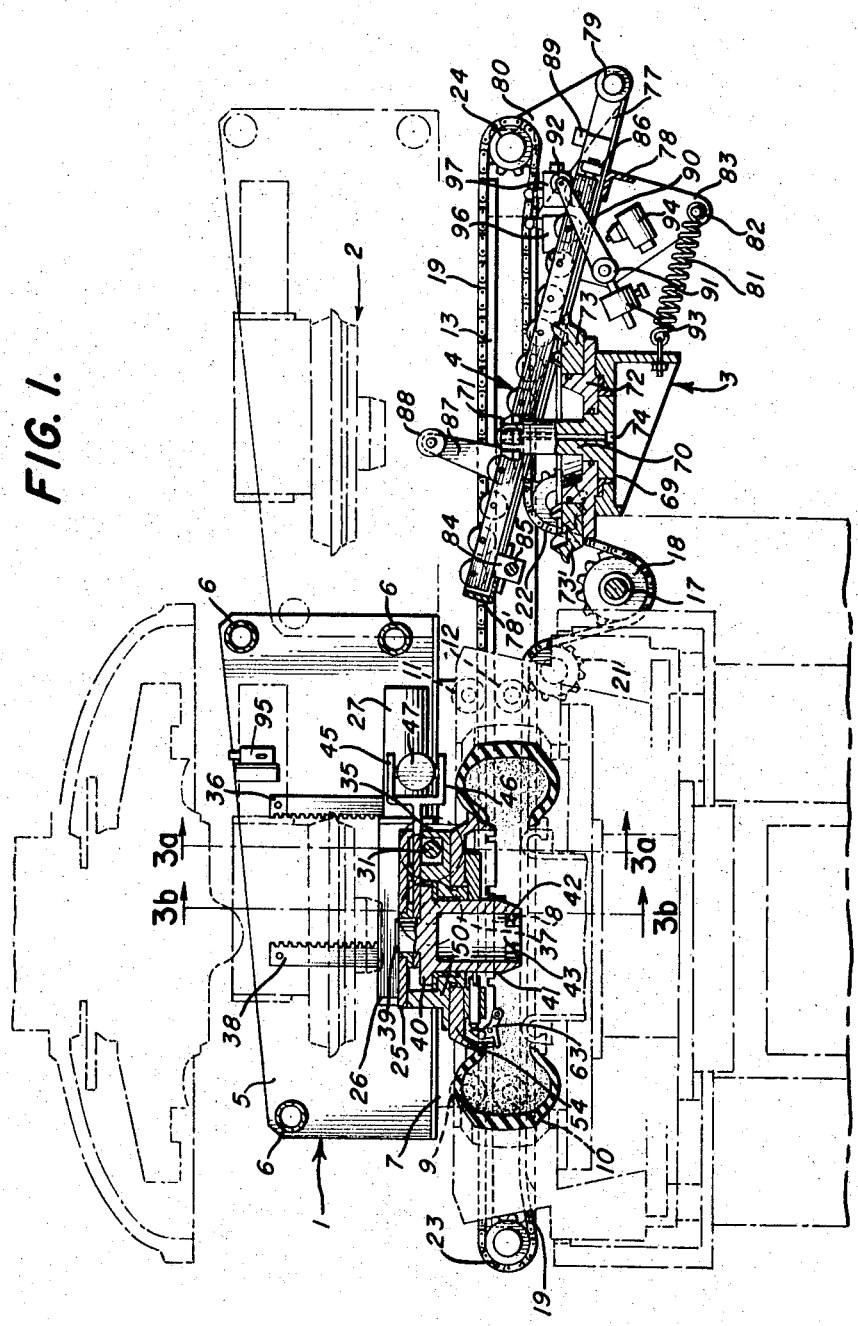

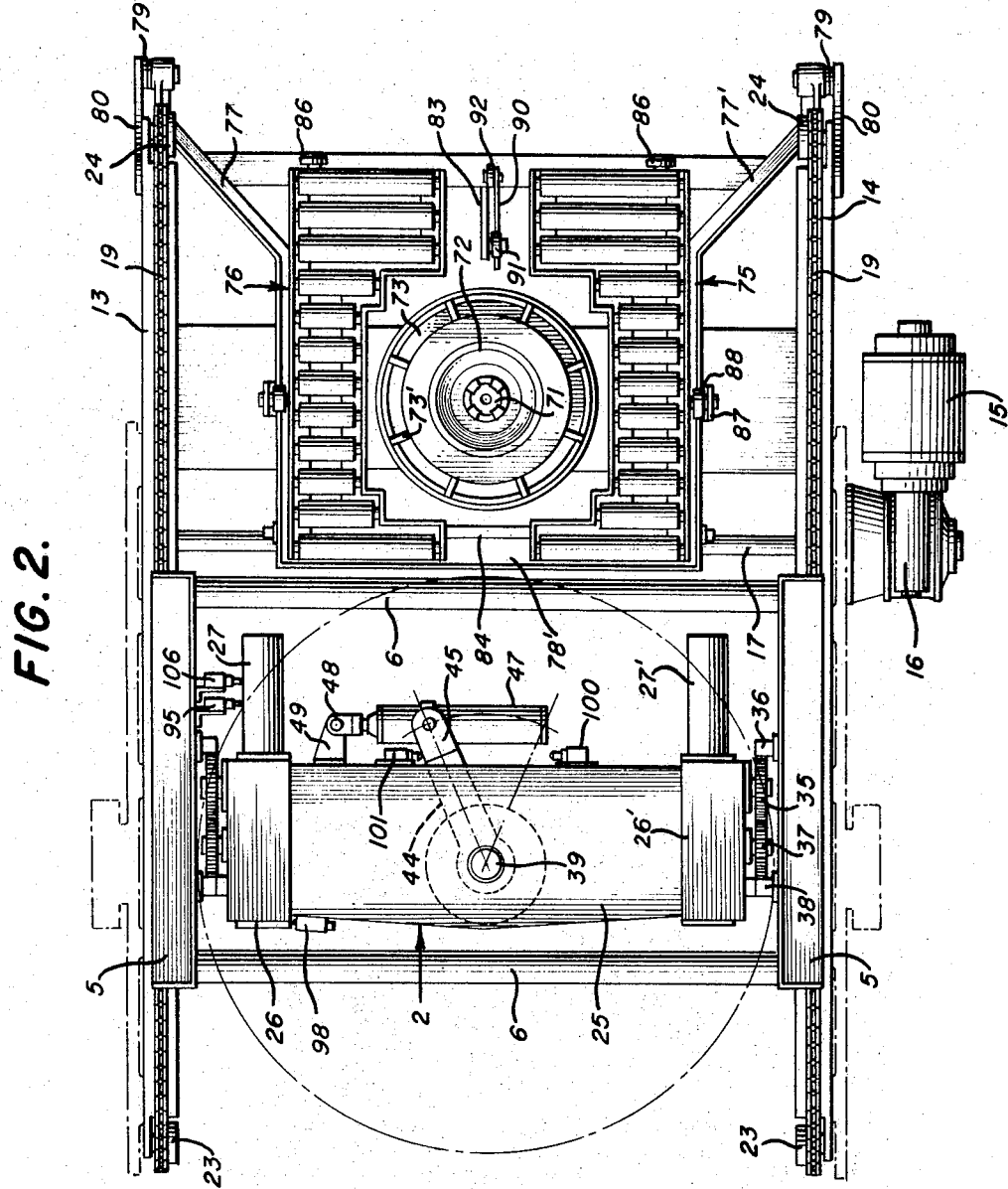

BY
ATTORNEYS

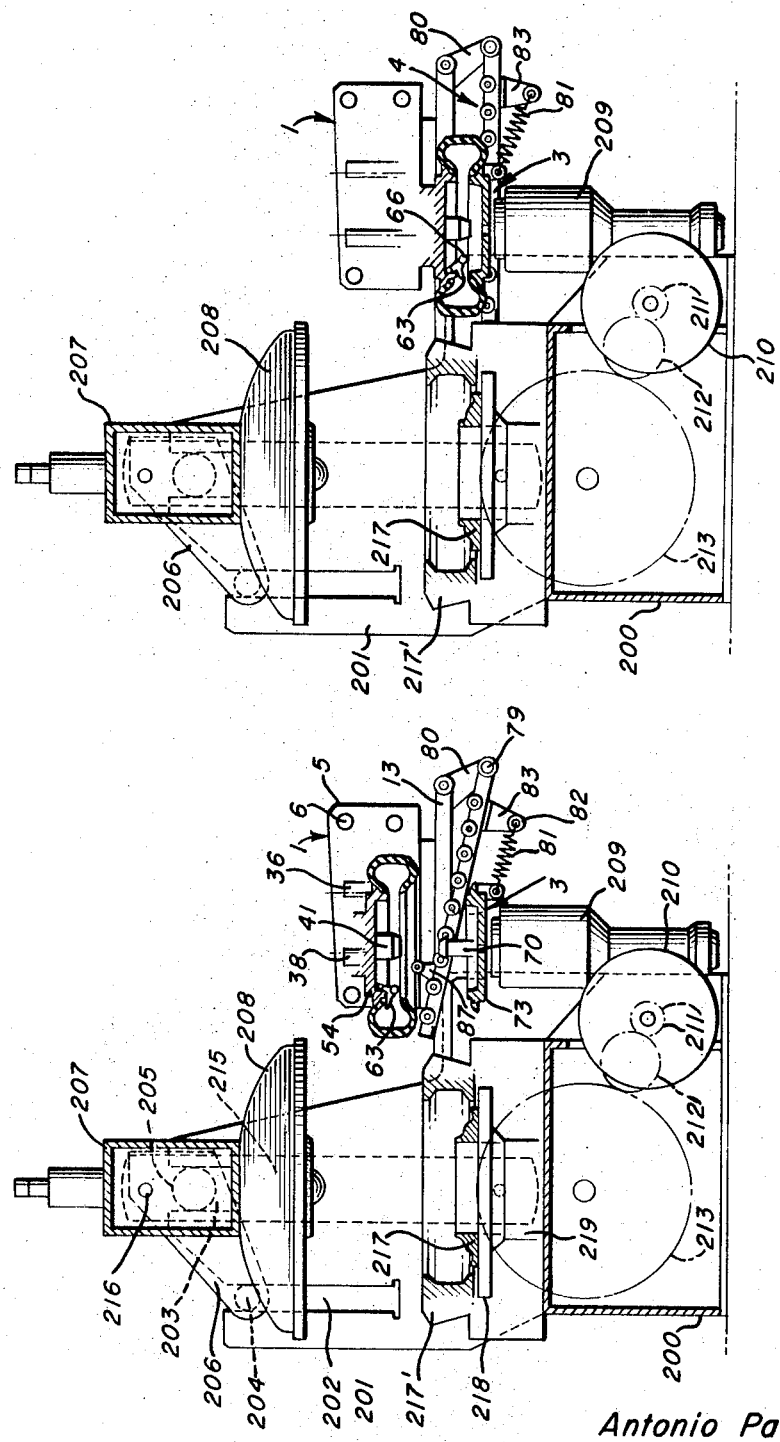

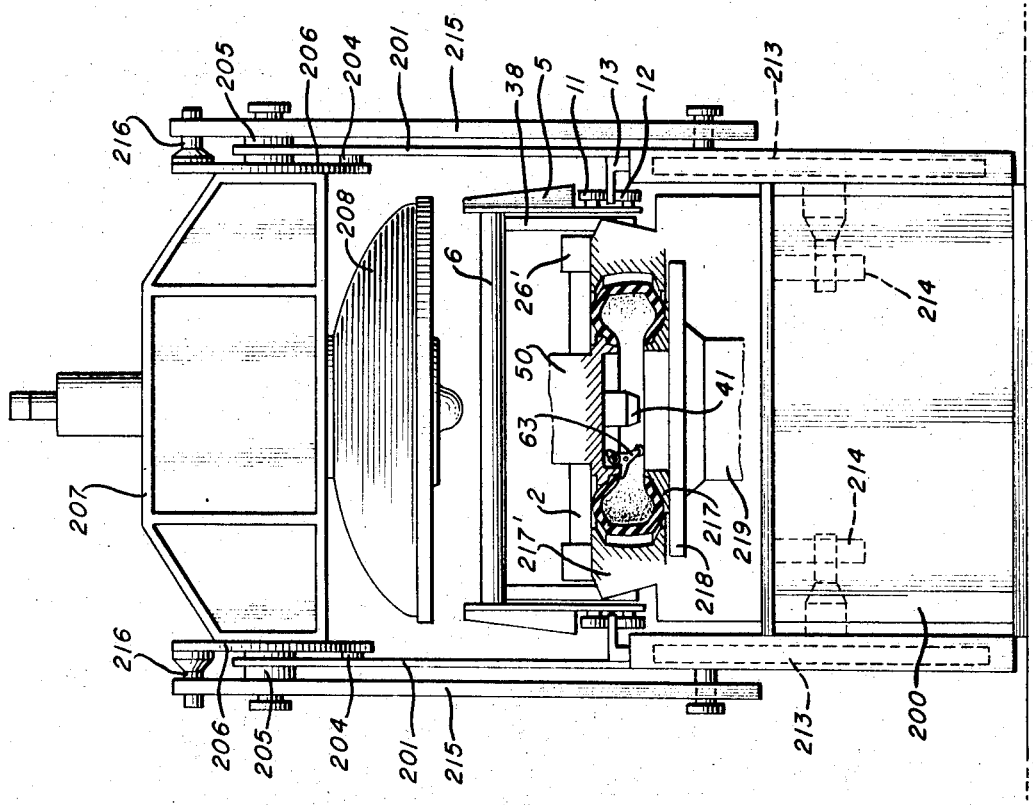

United States Patent Office 3,343,208
Patented Sept. 26, 1967

3,343,208
DEVICE FOR REMOVING A PNEUMATIC TIRE FROM THE CURING UNIT AND FOR POST-INFLATING AND DISCHARGING IT
Antonio Pacciarini, Milan, and Renato Caretta, Gallarate, Italy, assignors to Pirelli, Società per Azioni, Milan, Italy
Filed Oct. 15, 1965, Ser. No. 496,344
Claims priority, application Italy, Jan. 30, 1965, 1,941/65
9 Claims. (Cl. 18—2)

The present invention relates to the curing of pneumatic tires which are to be subjected to post-inflation immediately after curing, and more particularly to a device which automatically effects the removal of the tire from the mould of the curing unit, the post-inflation of the tire, and the discharge of the tire from the post-inflator.

Devices for removing the tires from the moulds of the curing units are already known. Also it is generally known to provide devices for the post-inflation of the tires which usually consist of two circular elements, each of which is peripherally provided with a seat intended to receive one of the tire beads. These elements are usually coaxial with respect to each other and are mutually displaceable only along their axis.

The object of the present invention is an apparatus by means of which it is possible to remove a tire from the mould of the curing unit by using the upper part of the post-inflator, without resorting to further specific means, and which allows the removal of the tire, its subsequent displacement to the post-inflator, and its discharge from the latter according to a completely automatic and particularly expeditious process.

The time saved in the operations of removal and displacement of the tire may be therefore advantageously used to prolong the post-inflation which permits a better cooling of the reinforcements of the carcass plies and consequently a safer settlement of the tire sizes.

The features of the apparatus according to the present invention will now be described with reference to the attached drawings, which illustrate by way of non-limiting example a form of embodiment of the invention itself.

In said drawings:

FIGURES 1 and 2 represent in cross section and in top view, respectively, the device seen in its whole;

FIGURES 3 and 4 represent, in section, the driving gears for the carriage and the upper ledger. The right portion of FIGURE 3 corresponds to the vertical section 3a—3a of FIGURE 1, and the left portion of FIGURE 3 corresponds to the vertical section 3b—3b of FIGURE 1;

FIGURES 7–10 represent in cross section, a curing unit provided with the device according to the invention, in four subsequent positions of the operating cycle and FIGURE 11 represents, in front general view, partially sectioned, the curing unit shown in the preceding figures.

Figures 3, 4:
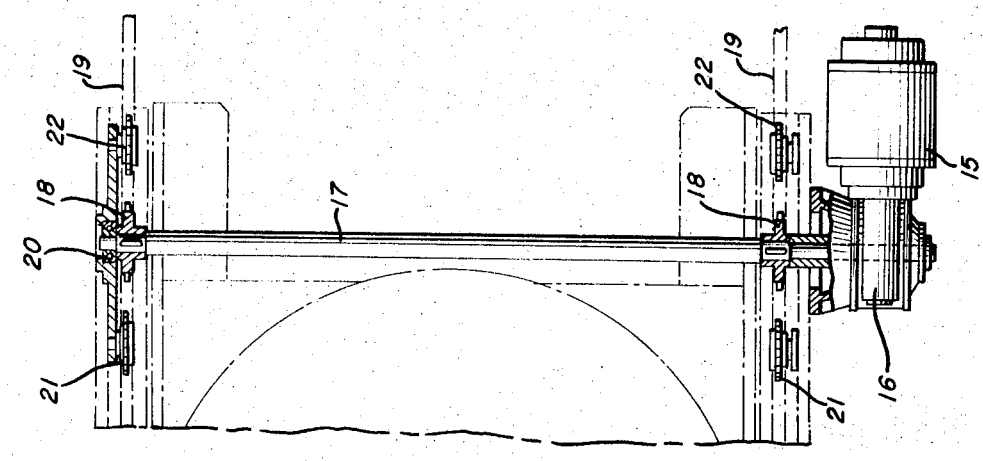

The post-inflating and discharging automatic device is applied to a curing unit schematically indicated in dotted lines in FIGURES 1 to 4, and includes a carriage 1 slidable in a horizontal direction on suitable guides integral with the frame of the curing unit, and a ledger 2 assembled on the carriage 1 over which it may be displaced in vertical direction. Ledger 2 constitutes the upper part of a post-inflator and is provided with means to clamp the tire bead. Three represents the lower part of the post-inflator, which is generally secured to the base of the curing unit. Platform 4 has a series of rollers thereon, is pivoted to one end of the guides of the carriage 1, and may be tilted to carry out the discharge of the tire when the working cycle is over.

The carriage 1 includes two plates 5 connected by wind-bracing tubular structural shapes 6 (see FIGURES 1 and 2). To the lower flange of each of the plates 5 there is fastened a structural shape 7 on which is pivoted wheel 8 having a vertical axis, and wheels 9, 10, 11 and 12, each having a horizontal axis (see FIGURES 1 and 3). These wheels ensure the sliding of the carriage 1 along rectilinear guides 13 and 14 which are integral with the frame of the curing unit.

The power for the motion of the carriage 1 is supplied by an electric motor 15 (see FIGURES 2 and 4) and is transmitted through speed reducer 16, shaft 17, sprocket wheels 18 and chains 19, the last being closed in the form of a ring on the carriage 1. The speed reducer 16 is connected at one end to, and directly actuates, the shaft 17. The other end of shaft 17 is supported by the base of the curing unit and rotates within the ball bearing 20 (see FIGURE 4). The sprocket wheels 18 are keyed, one on each side, on the shaft 17 and mesh with the chains 19, the latter being slidable along the guides 13 and 14 and being disposed one on each side of shaft 17.

Four transmission wheels are provided for each chain; wheels 21 and 22 pivoted on the inner surface of the side-walls of the curing unit, and wheels 23 and 24 pivoted at the ends of the guides 13 and 14 (see FIGURES 1 and 2).

The carriage 1 supports the ledger 2 which comprises the upper part of a post-inflator and the relative elements necessary for its working and which has a central portion provided with means able to clamp the tire bead. The ledger 2 is provided with an upper plate 25 and with two sidewalls 26 and 26' parallel to the plates 5 of the carriage 1, in which there are respectively assembled the double-acting cylinders 27 and 27'. Inside each of the cylinders 27 and 27' slides a piston 28 actuated by compressed fluid. Rack 29 is located on the stem of piston 28 (see FIGURE 3). The racks 29 engage with the corresponding sprocket wheels 30 which are keyed on the shaft 31, the latter being housed in the ledger 2 and supported by the sidewalls 26 and 26'. Shaft 31 rotates in ledger 2 and is protected by the ball bearings 32. The above described elements are enclosed in the ledger 2 by means of the protecting plates 33 and 34.

At the end of the shaft 31, and more outwardly with respect to the wheels 30, there are keyed two additional sprocket wheels 35 which engage with vertical racks 36, the latter being integral with the sidewalls 5 of the carriage 1. Sprocket wheels 35 also engage with the sprocket wheels 37 which are pivoted in the sidewalls 26 of the ledger 2. The sprocket wheels 37, besides engaging with the wheels 35, also engage with the vertical racks 38, the latter being integral with the sidewalls 5 of the carriage 1.

Figure 5:
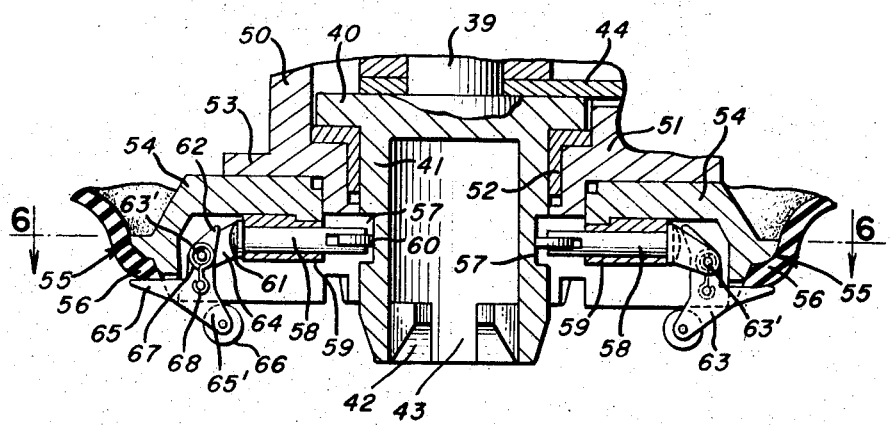
FIGURE 5 represents the central portion of the upper ledger of the post-inflator, taken along the vertical section 5—5 of FIGURE 6.

A core 39 having an enlarged crown 40 and a lower body 41 in the form of a hollow cylinder is assembled in the central portion of the ledger 2, and is rotatably pivoted in the plate 25. The lower edge of the hollow cylinder is provided with teeth 42 and grooves 43 (see FIGURES 1, 2 and 5). A fork 44 is pivoted in the core 39 and is fastened to crown 40 so as to rotate together with core 39. The fork 44 extends outside the ledger 2, passes through a suitable opening, and has arms 45 and 46 which are pivoted, in a diametrally opposite position, on the outer surface of a double-acting cylinder 47 actuated by fluid under pressure. The stem of the piston slidable inside the cylinder 47 is pivoted in the pin 48 secured to the support 49 integral with the ledger 2 (see FIGURE 2).

A cylindrical hollow body 50, integral with the lower surface of the plate 25, is provided in its inside with an annular projection 51 onto which, through a bush 52, rests the crown 40 of the revolving core 39. Cylindrical body 50 is provided on its outer surface with a crown 53 which is connected with a ring 54. On the lower edge of said ring shoulder 55 is provided, against which is pressed the bead 56 of the tire during its clamping (see FIGURE 5).

Figure 6:
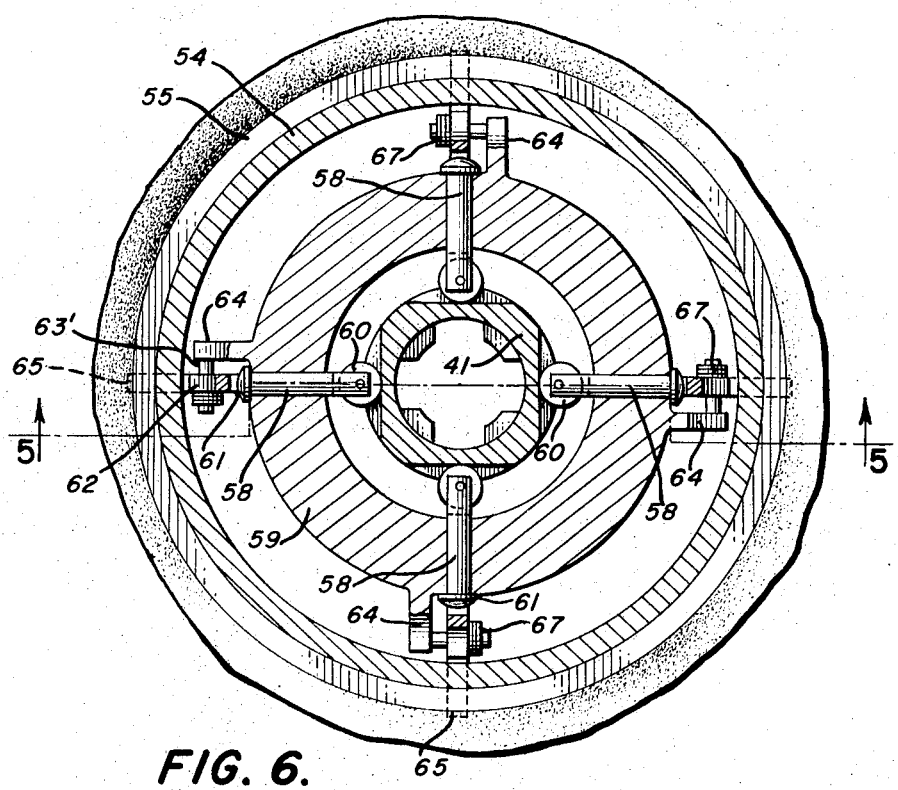
FIGURE 6 represents again the central portion of the upper ledger of the post-inflator, taken along the horizontal section 6—6 of FIGURE 5.

The outer surface of the hollow body 41 is provided with four recesses 57 disposed at equal distance therealong. Four pins 58 are slidable within suitable seats obtained in a ring 59 integral with the lower surface of the ring 54. The end of each pin 58 adjacent hollow body 41 has a small wheel 60 pivoted to it, while the opposite end terminates with a head 61 on which acts the arm 62 of an element 63, the last being pivoted in the pin 63' assembled on the extension 64 of the ring 59 (see FIGURES 5 and 6). A second arm 65 of said element 63 passes through suitable recesses of the lower edge of the ring 54, and cooperates with the shoulder 55 in order to clamp the bead 56 of the tire. The third arm 65' of the element 63 carries, pivoted to it, a roller 66 which, during the closure of the device, slides on the lower plane of the post-inflator. This allows the element 63 to penetrate into the cavity of the post-inflator while rotating about the pin 63'. The element 63 is kept pushed against the head 61 of the pin 58 by a bending spring 67 which is wound up at one end about the pin 63', and hooked at the other end on the pin 68.

The lower part 3 of the post-inflator is disposed in the rear part of the curing unit (at the right in FIGURE 1), and, in the described form of embodiment, is directly supported by the base of the curing unit.

The supporting plane 69 has a central core 70 which terminates upwardly with a crown 71 provided with teeth and grooves corresponding to those present on the lower edge of the cylindrical hollow body 41. The plane 69 is integral with a ring 72, onto which there is assembled a crown 73. On the upper edge of said crown there are provided ribs 73' which are utilized to correctly center the tire. A duct 74 for the introduction of the inflating fluid extends axially in the core 70.

The device for discharging the tire at the end of the operating cycle consists of a tiltable platform 4 which comprises a series of rollers and is divided into two sectors 75 and 76, these sections being symmetrical with respect to the transversal axis of the curing unit (see FIGURES 1 and 2). The tiltable platform 4 is supported by a frame including the structural shapes 77 and 77' and the ledgers 78 and 78'. The platform is rotatably pivoted about pins 79 of the arms 80, which are integral with the guides 13 and 14 and, therefore, with the whole structure of the curing unit. The tiltable platform 4 is also connected to the plane 69 supporting the lower part of the post inflator by means of the springs 81 which are hooked with one end on such support. The other end of each of said springs is hooked on the pin 82 of the plate 83, the latter being integral with the ledger 78 (see FIGURE 1).

The two sectors 75 and 76 of the tiltable platform 4 are connected through a rod 84 rotating within bushes (not shown) which are fast with the ledger 78'. The ends of the rod 84 are provided with threads directed in opposite sense so that if they are rotated in the corresponding nut screws 85, which are secured to the sectors 75 and 76, the sectors will slide to and from each other on the ledger 78 by means of the rollers 86.

In order to control and to adjust the inclination of the platform 4, the following elements are provided: two arms 87 integral with the tiltable platform 4, each of which carries, pivoted at its upper end, a small wheel 88; two stops 89 on the arms 80; a lever 90 rotatably pivoted in the pin 91 of the plate 83, which is provided at one end with a small wheel 92 and at the opposite end with an adjustable counterweight 93.

The operating cycle of the described device is carried out in a completely automatic manner by means of electric or pneumatic micro-switches. As seen in FIGURE 1, microswitch 94 is secured to the plate 83 and actuated by the lever 90 to start the cycle. The microswitch 95 (see FIGURES 1, 2 and 3) is secured on the inner surface of a sidewall 5 of the carriage 1 and is actuated by the corresponding cylinder 27 when the ledger 2 is in its highest position. This controls both the displacement of the carriage 1 from the curing unit to the post-inflator and the releasing of the tire to discharge it after the post-inflation. The microswitches 96 and 97 (see FIGURES 1 and 3) are secured to the guide 13 and actuated by the wheel 12, the microswitch 96 being utilized to slow down the motion of the carriage 1 toward the post-inflator, and the microswitch 97 intended to stop the carriage 1 and to lower the ledger 2 to close the post-inflator. The microswitch 98 (see FIGURES 2 and 3) is secured to the ledger 2, and is pushed against the edge 99 of the central portion of the mould of the curing unit to operate the engagement and the disengagement of the tire. The microswitches 100 and 101 (see FIGURE 2) are secured to the ledger 2 and actuated by the fork 44. Microswitch 100 is utilized to vertically displace the ledger 2 on the carriage 1, and microswitch 101 is utilized to admit the post-inflating fluid in the tire through the duct 74. The microswitches 102 and 103 (see FIGURE 3) are secured in the inside of one sidewall of the curing unit and actuated by the cams 104 and 105 disposed on the corresponding sidewall of the carriage 1. Microswitch 102 is utilized to slow down the motion of the carriage 1 from the post-inflator to the curing unit and microswitch 103 is utilized to stop the carriage 1 and to lower the ledger 2 for clamping the tire. The microswitch 106 (see FIGURE 2) is secured in the lower part of the inner surface of a sidewall 5 of the carriage 1, and is actuated by the corresponding cylinder 27 to control the disengagement of the tire when the ledger 2 is in position for post-inflation.

Referring to FIGURES 7 to 11, the operating cycle of the device forming the object of the present invention is described as applied to a curing unit, the lid of which, carrying the upper part of the mould, may move only in vertical direction and remains parallel to a horizontal plane. When the curing unit is opened, the device of the present invention is to be inserted between the lid and the lower part of the mould containing the tire.

The curing unit represented in FIGURES 7 to 11 comprises a base 200, to which are fastened the sidewalls 201, each of which is provided with two rectilinear vertical guides 202 and 203. Rollers 204 and 205 respectively slide in guides 202 and 203 and are pivoted in the plate 206 integral with the ledger 207. Below the latter there is attached the lid 208 of the curing unit, to which is integral the upper section of the mould. The ledger 207 is raised and lowered by actuating an electric motor 209 which, through the speed reducer 210 and the gears 211 and 212, puts into rotation the driving wheels 213. These wheels are disposed one on each side and are supported by the supports 214 in the base 200 of the curing unit (see FIGURE 11). To each wheel 213 there is connected one end of a lever 215 which is pivoted at the other end in the pin 216 of the plate 206. The lower section 217 and the intermediate section 217' of the mould are assembled on a plate 218 which is fastened to the upper end of a stem 219 slidable in a single-acting cylinder housed in the base 200.

Figures 7, 8:
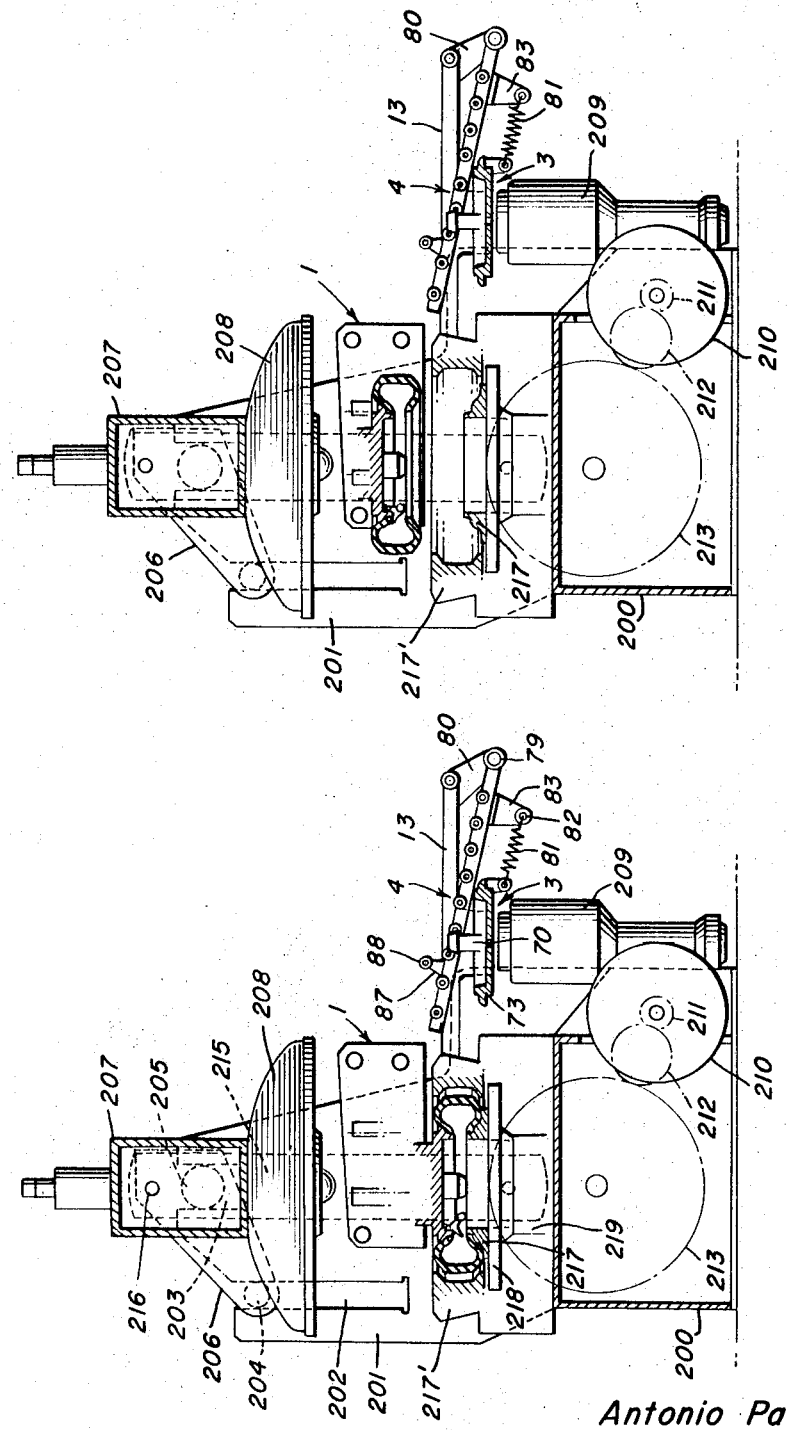

To describe the operating cycle of the device according to the invention, it will be assumed that the curing unit is in the opened position shown in FIGURES 7 and 11. The upper portion of the mould is completely raised, the cured tire is contained in the lower section 217 of the mould, the carriage 1 is inside the curing unit, and the ledger 2 is in its lowest position, prepared for the engagement of the tire.

In this position the miscroswitch 98 (see FIGURES 2 and 3) is pressed by the edge 99 of the intermediate section 217' of the mould, and therefore effects the clamping of the tire, by controlling the introduction to one side, and the discharge from the other side, of a compressed fluid in the cylinder 47. This, in turn, causes the clockwise rotation of the cylinder about the pin 39 and, at the same time, its rotation and its sliding with respect to the pin 48. The fork 44, integral with the cylinder 47, rotates about the pin 39, causing the core 41 to rotate in such a way that the recesses 57 engage the small wheels 60 (see FIGURES 5 and 6). The pins 58, being pushed by the arms 62 of the elements 63 operated by the spring 67, then slide within the corresponding seats in the ring 59 and permit the rotation of elements 63 about the pins 63' until the arms 65 clamp the tire bead 56 against the shoulder 55 of the ring 54. At this moment the rotation of the fork 44 is completed, and it actuates the microswitch 100 (see FIGURE 2) which controls the lifting of the ledger 2 by means of the introduction and discharge, from the opposite sides, of compressed fluid in the cylinders 27 and 27'. This, in turn, causes the sliding of the pistons 28, whose racks 29 put into rotation the sprocket wheels 30 and therefore the shaft 31 on which said sprocket wheels are keyed. On the shaft 31 there are also keyed the sprocket wheels 35 which begin to rotate and engage the racks 36 and the sprocket wheels 37, which in turn engage with the racks 38 (see FIGURE 3). By virtue of the rotation of the sprocket wheels 35 and 37 on the racks 36 and 38, the ledger 2 moves to its highest position on the carriage 1, removing the tire from the lower section 217 of the mould (see FIGURE 8). At the end of the upward motion of the ledger 2, the cylinder 27 (see FIGURES 2 and 3) actuates the microswitch 95 starting the motor 15 which, through the speed reducer 16, imparts rotation to the shafts 17 (see FIGURE 4) and to the sprocket wheels 18, keyed onto it. Chains 19 engage said wheels and drag the carriage 1 causing it to slide on the guides 13 and 14 by means of the wheels 8–12 (see FIGURE 1).

The carriage 1 is therefore displaced towards the post-inflating and discharging automatic device. The motion of carriage 1 is at first slowed down, and then stopped by the subsequent intervention of the microswitches 96 and 97 actuated by the wheel 12 (see FIGURES 1 and 3).

The microswitch 97, besides stopping the carriage 1 in the correct position over the lower part of the post-inflator (see FIGURE 9), controls the downward motion of the ledger 2 by introducing the compressed fluid from one side and discharging it from the opposite side of the cylinders 27 and 27'. This causes a sliding of the pistons 28 whose racks 29 put into rotation the sprocket wheels 30, the shaft 31 and, therefore, the sprocket wheels 35 and 37; the latter engage each other and, respectively, engage the racks 36 and 38. The ledger 2, in its downward motion, pushes with its lower plate 34 on the arms 87 of the tiltable platform 4 (see FIGURE 1), thus causing its rotation against the tension of springs 81, about the pins 79 into a horizontal position 81.

When the ledger 2 reaches the position of post-inflation (see FIGURE 10), the cylinder 27 actuates the microswitch 106 (see FIGURE 2) which controls the disengagement of the tire. For this purpose, the compressed fluid is introduced and discharged from the opposite ends of the cylinder 47, which rotates counterclockwise about the pin 39 in addition to rotating and sliding with respect to the pin 48.

The fork 44 rotates integrally with the cylinder 47, causing the portion of core 41 not provided with recesses to engage the rollers 60, so as to push the pins 58 inside the corresponding seats located in the ring 59. The action of the springs 67 is thus opposed, and the elements 63 rotate about the pins 63' detaching the tire bead 56, while the rollers 66 (see FIGURE 10) roll on the edge of the crown 73. The elements 63 may then penetrate the space comprised between the upper part and the lower part of the post inflator to allow the closure of the latter. The rotations of the core 41 also permit the engagement of the teeth 42 of the lower edge of the core 41 with the corresponding teeth of the upper crown 71 of the core 70 of the post-inflator.

The tire is consequently enclosed in the post-inflator with sufficient tightness to withstand the pressure of the inflating fluid which is then introduced through the duct 74 due to the action of the microswitch 101, the latter being actuated by the fork 44 at the end of its rotation.

The operation of post-inflating a tire ends synchronously with the operation of curing the next tire. Therefore the opening of the post-inflator is carried out by means of the same cycle timer which controls the opening of the curing unit.

The steps of engaging the tire to the ledger 2 and of lifting the latter over the carriage 1 are then repeated in the above described manner. Due to the lifting of the ledger 2, the tiltable platform 4 tilts again, rotating about the pins 79 by virtue of the springs 81, until the structural shapes 77 and 77' meet with the stops 89 secured to the arms 80 (see FIGURE 1). When the ledger 2 has reached its highest position over the carriage 1, the cylinder 27 actuates the microswitch 95 which controls the disengagement of the tire from the ledger 2 and the consequent rotation of the elements 63 as described above, this resulting in a release of the tire bead from the clamping means. The tire falls on the tiltable platform 4 and slides thereon towards the discharge station. Along its travel on the tiltable platform 4 the tire engages the upper end of the lever 90 (see FIGURE 1) which is rotated downward about the pin 91 until it engages and actuates the microswitch 94, thus effecting the starting of a new cycle. The motor 15, which displaces the carriage 1 from the post-inflator to the curing unit, is then started again. The motion of the carriage 1 is slowed down by the action of the microswitch 102 and then stopped by the action of the microswitch 103 which also controls the downward motion of the ledger 2. Such microswitches are respectively actuated by the cams 104 and 105 (see FIGURE 3).

A new operating cycle, which is carried out by repeating the above described steps, starts when the carriage 1 is stopped and the ledger 2 is lowered for the engagement of the completely cured tire.

The advantages offered by a device of this kind are many and include, for example:

(1) The possibility of carrying out all the working steps after the curing step by means of a single device.

(2) The possibility of complying with all the requisites for the automation of the operating cycle which is synchronized with that of the curing unit.

(3) The possibility of lightening the structure of the curing unit, owing to the fact that, as the upper part of the mould moves only in vertical direction, the dynamic stresses, to which the supporting elements are subjected, may be reduced.

(4) The possibility of using this device for any type of tire, irrespective, within certain limits, of the tire size.

There has been illustrated and described what is considered to be preferred embodiments of the invention. It will be understood, however, that various modifications may be made without departing from the broader scope of the invention as described by the following claims.

What is claimed is:

1. A device for performing a series of operations on a pneumatic tire after it has been cured in a curing mold; said device comprising a post-inflator having an upper portion and a lower portion, said upper portion including means to transfer the tire from the curing mold to said lower portion of the post inflator for the post-inflation of said tire; and means to discharge said tire after said post-inflation.

2. A device for performing a series of operations on a pneumatic tire after it has been cured in a curing mold; said device comprising a post-inflator having an upper portion and a lower portion; a carrier moveable between said curing mould and said post inflator; a transferring member disposed on said carrier, said transferring member forming the upper portion of the post inflator and including means to grasp and release said tire at said curing mould and said post inflator, respectfully; said lower portion of said post inflator having a peripheral seat suitable to receive said tire, and means for moving said transferring member relative to said carrier in and out of engagement with said curing mould and the lower portion of said post inflator.

3. The device of claim 2 wherein said means to grasp and release said tire comprises a circular cap peripherally provided with a seat intended to receive the upper bead of said tire, at least one revolving arm mounted on said cap, means cooperating with said arm and said seat to clamp said bead upon actuation of said arm, and means to actuate said arm at predetermined positions of said carrier and said transferring member.

4. The device of claim 3 wherein said cap has a central hole and wherein said cooperating means comprises a hollow cylinder disposed in said hole, rotatable in response to movements of said revolving arm, and having a series of radially extending recesses; a pin disposed in each of said recesses and cooperating with said cylinder so as to be radially slidable in response to rotation of said cylinder, and a plurality of spring-loaded clamping members pivotally mounted with respect to said cap, each of said members having a first arm cooperating with said pins to pivot said member, and a second arm adapted to clamp and release said bead upon pivotable movements of said clamping member.

5. The device of claim 2 wherein said transferring member and said lower portion of said post-inflator each have corresponding mating surfaces so that an integral structure is formed when said transferring member is moved into engagement with said lower portion of said post inflator, and further comprising means to introduce a fluid into said structure to post inflate said tire.

6. The device of claim 5 wherein said transferring member is provided in a central position with a series of teeth and grooves able to temporarily engage with a corresponding series of teeth and grooves provided on a central core of said lower portion of said post-inflator by rotating said central core.

7. The device of claim 6 further comprises means to discharge the tire from said device after said post-inflation.

8. The device of claim 7 wherein said discharge means comprises a normally inclined sliding platform pivotally mounted with respect to the lower portion of said post-inflator, and having an opening suitable to allow the passage of said transferring member.

9. The device of claim 8 further comprising two sets of adjustably spaced rollers mounted on the upper surface of said platform and means to adjust the relative distance between said sets according to the diameter of said tire.

References Cited

UNITED STATES PATENTS

| | | | |
|---|---|---|---|
| 2,978,741 | 4/1961 | Soderquist | 18—2 |
| 3,065,499 | 11/1962 | Brundage et al. | 18—2 |
| 3,097,394 | 7/1963 | Mallory et al. | 18—2 XR |
| 3,141,191 | 7/1964 | Soderquist | 18—2 |
| 3,153,263 | 10/1964 | Mallory et al. | |
| 3,222,716 | 12/1965 | Harris | 18—2 |
| 3,241,180 | 3/1966 | Brundage | 18—2 |

J. SPENCER OVERHOLSER, *Primary Examiner.*

J. HOWARD FLINT, JR., *Examiner.*